Jan. 2, 1923.
A. F. JENKINS.
METAL COATING AND WELDING APPARATUS.
FILED FEB. 19, 1920
1,441,094
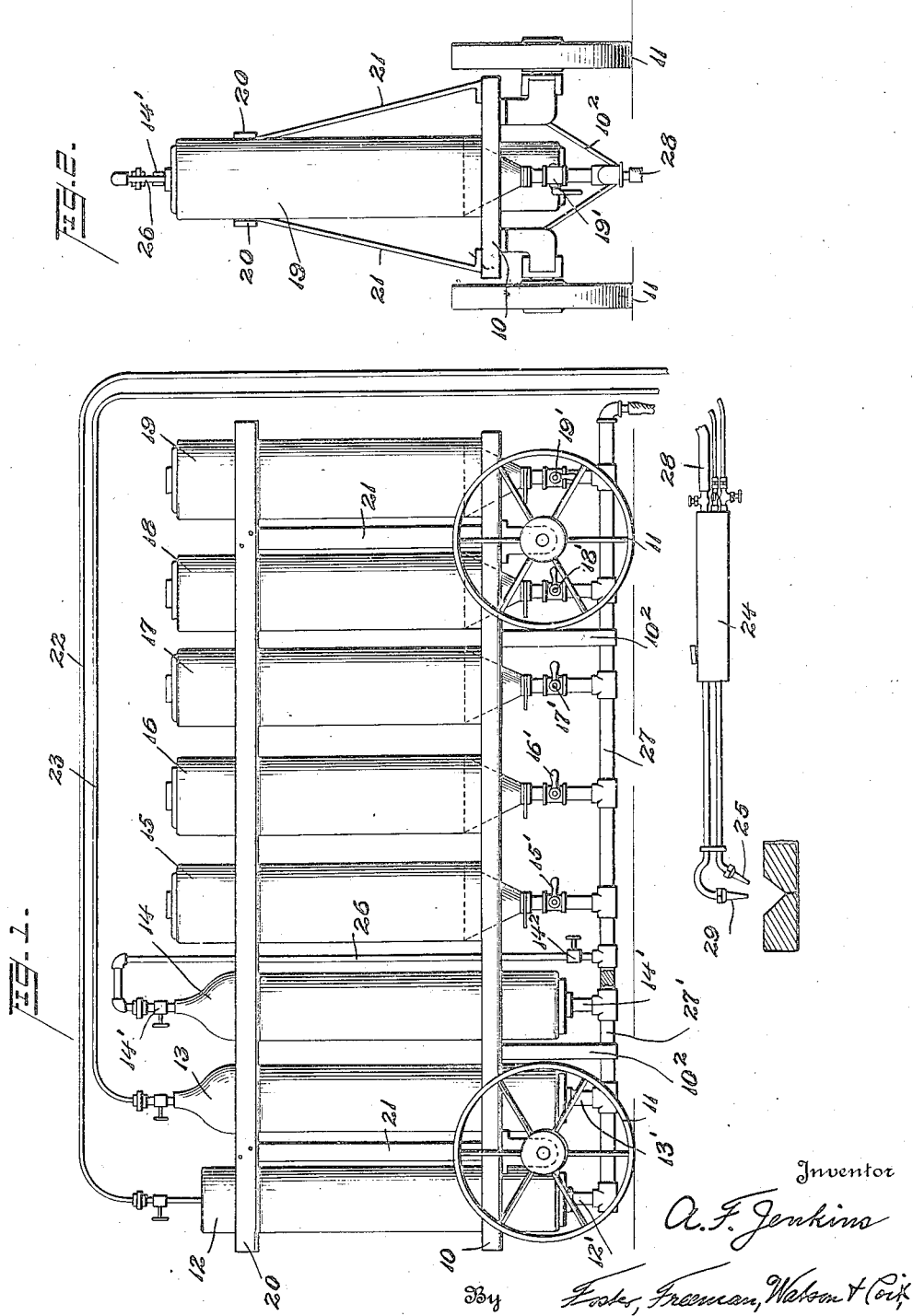

Patented Jan. 2, 1923.

1,441,094

UNITED STATES PATENT OFFICE.

ALEXANDER F. JENKINS, OF BALTIMORE, MARYLAND.

METAL COATING AND WELDING APPARATUS.

Application filed February 19, 1920. Serial No. 359,910.

*To all whom it may concern:*

Be it known that I, ALEXANDER F. JENKINS, a citizen of the United States, and residing at Baltimore city, State of Maryland, have invented certain new and useful Improvements in Metal Coating and Welding Apparatus, of which the following is a specification.

It is the object of this invention to provide an improved apparatus for metal welding and coating. The present invention relates particularly to the type of metal welding and coating apparatus in which the metal used in forming the weld or the coat is conveyed to the heating or welding flame, or to the work adjacent the heating or welding flame, in granular form. The method of welding or coating in which the welding metal is supplied in granular form, has been found in most instances to be superior to the method in which the metal is supplied in the form of a stick or tube. One difficulty with devices heretofore designed or suggested for welding with granular metal is that they have proven inconvenient in operation upon work of a large size, because of the fact that the torch used for heating the work can not be burdened with a receptacle for granular metal of sufficient size for long continued operation, without destroying its portability.

It is the particular object of this invention to provide a portable apparatus adapted for welding or coating operations upon a large scale, at the same time maintaining the torch of small size and weight, and also giving the operator option to use any one of a number of different metals as desired by merely operating certain valves.

One form of the invention will be disclosed in the following description when taken in connection with the accompanying drawings, in which Fig. 1 is a side elevation of an apparatus embodying the invention, the torch being illustrated in position for a welding operation;

Fig. 2 is an end view of the same, the torch and flexible connections being omitted.

As shown in the drawings a platform 10 supported upon wheels 11 for convenient movement along a floor of any kind carries a series of vertical metallic receptacles, illustrated in the form of cylindrical tanks, which are adapted to contain the gases supplied to the welding flame of a torch, a compressed gas for transporting or blowing metallic particles to a nozzle adjacent the welding tip, and a plurality of different metals in granular form. The receptacles or tanks may be arranged in any convenient order, but in the embodiment illustrated the tank 12 contains compressed oxygen, the tank 13 acetylene, the tank 14 compressed air, and the tanks 15, 16, 17, 18 and 19 contain copper, aluminum, brass, iron and steel respectively, in comminuted form.

The tanks 12, 13, and 14 are supported upon pedestals 12', 13' and 14' secured to and extending upwardly from a tube 27', which is a continuation of the horizontal tube 27, hereinafter to be described. The tube 27 comprises a gas conduit but does not communicate with tube 27', a solid section being interposed. The continuous tube comprising sections 27' and 27 is supported by means of hangers $10^2$, the upper ends of which are secured to the under side of the platform 10.

The metal containing tanks 15, 16, 17, 18 and 19, are supported upon platform 10, as shown in the drawings, with their hopper shaped bottoms extending through apertures formed in the platform.

The tanks are laterally supported at their upper ends by side rails 20, which are in turn maintained in position by inclined braces 21 secured to the platform 10. To the upper ends of the oxygen and acetylene tanks 12 and 13, are connected flexible conduits 22 and 23 respectively for conducting gases to the torch 24, having a welding tip 25. Suitable valves located at the tanks and at the torch control the passage of gas to the welding tip. The tank or receptacle 14 which contains the compressed air or other compressed fluid for transporting or blowing granular metal to the torch, is connected by means of a pipe 26 to the horizontally disposed pipe 27 extending longitudinally of the carriage below the platform 10 and the several tanks. The pipe or conduit 27 is connected by a vertical branch pipe to the hopper shaped bottom of each of the comminuted metal containing receptacles.

Hand valves 14' and $14^2$ control the passage of the compressed fluid from the tank 14 into conduit 27 and valves 15', 16', 17', 18' and 19' control the flow of granular metal from the metal containing tanks respectively to the trunk conduit 27. This trunk conduit 27 has connected to its end a flexible tube 28, the other end of which is connected to a pipe of torch 24, which leads to the metal spraying nozzle 29. A suitable valve at the base of the torch controls the passage of compressed air or gas and granular metal to the spraying nozzle 29.

The apparatus described is especially useful in welding or coating operations of extensive character in which large quantities of metal are required. The gas and metal containing receptacles being conveniently mounted on a wheeled truck, can be transported readily to any location, factory, shipyard, or other similar commercial establishment. The torch being flexibly connected to the supply tanks, may be used at a considerable distance therefrom and in difficult positions without inconvenience. Inasmuch as it is not provided with a receptacle for granular metal, it may be of the usual portable character. By opening the proper valve the operator may weld or coat with any of the metal contained in the tanks or receptacles, the other receptacles being shut off from communication with the trunk line leading to the torch. In the drawings I have shown the valve 19' open, and the remaining valves closed.

It is obvious that changes may be made in the arrangement of parts of this invention, which is not limited to the exact form shown and described.

Having thus described the invention what is claimed as new and desired to be secured by Letters Patent is:

1. In apparatus of the class described, the combination with a heating torch of means for feeding comminuted metal to the work adjacent the torch comprising a conduit, means for feeding comminuted metal into the conduit and means for creating a current of gas through the conduit, to convey the metal.

2. In apparatus of the class described, the combination with a heating torch, of means for feeding comminuted metal to the work adjacent the torch comprising a conduit, leading to the work, a tank of compressed gas having a valved discharge into the conduit, and a comminuted metal receptacle having a valved discharge into the conduit.

3. In apparatus of the class described, the combination with a heating torch of means for feeding comminuted metal to the work adjacent the torch, comprising a conduit, a plurality of receptacles having valved outlets communicating with the conduit, and means for creating a current of gas through the conduit.

4. In apparatus of the class described the combination with a heating torch of means for feeding comminuted metal to the work adjacent the torch, comprising a conduit leading to the work, a tank of compressed gas having a valved discharge into the conduit, and a plurality of receptacles having valved outlets communicating with the conduits.

5. In apparatus of the class described, the combination with a heating torch of means for feeding comminuted metal to the work adjacent the torch, comprising a conduit leading to the work, a tank of compressed gas having a valved discharge into the conduit and a receptacle above the conduit and having a valved outlet communicating therewith between the gas tank and the torch, the metal falling by gravity into the conduit when the valve is open.

6. Portable apparatus for welding or coating metals, comprising in combination, a torch having an orifice for gases to be burned, and an orifice for metal particles for welding or coating purposes, a frame supported on wheels, for convenient movement, individual storage receptacles for combustible gas, metal particles, and fluid for transporting the metal particles respectively, mounted on the frame, and flexible conduits connecting the torch and storage receptacles, for the purpose set forth.

7. Portable apparatus for welding or coating metals, comprising in combination, a torch having an orifice for gases to be burned and an orifice for metal particles for welding or coating purposes, a frame supported upon anti-friction devices for convenient movement, a storage receptacle for a combustible gas mounted on said frame, a flexible conduit connecting said receptacle and the torch, a receptacle for a fluid medium for transporting metal particles to the torch, mounted on the frame, a conduit connecting said receptacle and the torch and having a flexible portion, and a receptacle for metallic particles mounted on the frame and communicating with said last mentioned conduit, for the purpose set forth.

In testimony whereof I affix my signature.

ALEXANDER F. JENKINS.